US008028069B2

(12) United States Patent
Bandholz et al.

(10) Patent No.: US 8,028,069 B2
(45) Date of Patent: *Sep. 27, 2011

(54) STRUCTURE FOR SECURING LEASED RESOURCES ON A COMPUTER

(75) Inventors: Justin P. Bandholz, Cary, NC (US); Ralph M. Begun, Raleigh, NC (US); Andrew S. Heinzmann, Apex, NC (US); Fernando A. Lopez, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 723 days.

This patent is subject to a terminal disclaimer.

(21) Appl. No.: 12/165,313

(22) Filed: Jun. 30, 2008

(65) Prior Publication Data

US 2008/0263560 A1      Oct. 23, 2008

Related U.S. Application Data

(63) Continuation-in-part of application No. 11/382,080, filed on May 8, 2006, now Pat. No. 7,707,290.

(51) Int. Cl.
*G06F 15/173* (2006.01)
(52) U.S. Cl. ......... 709/226; 709/223; 709/220; 718/104
(58) Field of Classification Search ................... 709/226, 709/220, 223; 718/104
See application file for complete search history.

(56) References Cited

U.S. PATENT DOCUMENTS

| | | | |
|---|---|---|---|
| 6,080,204 A * | 6/2000 | Mendel | ........................ 716/103 |
| 6,418,557 B1 | 7/2002 | Otani | |
| 6,466,980 B1 | 10/2002 | Lumelsky et al. | |
| 6,725,262 B1 * | 4/2004 | Choquier et al. | ............. 709/221 |
| 6,728,766 B2 | 4/2004 | Cox et al. | |
| 6,760,736 B2 | 7/2004 | Waldo et al. | |
| 6,816,875 B2 | 11/2004 | Wollrath et al. | |
| 6,950,874 B2 | 9/2005 | Chang et al. | |
| 7,036,006 B2 * | 4/2006 | Bandhole et al. | ............. 718/104 |
| 7,370,013 B1 | 5/2008 | Aziz et al. | |
| 7,707,290 B2 | 4/2010 | Bandholz et al. | |
| 7,797,705 B2 * | 9/2010 | Oka | ............................. 709/226 |
| 7,827,294 B2 * | 11/2010 | Merkow et al. | ............... 709/226 |
| 2002/0165819 A1 | 11/2002 | McKnight et al. | |
| 2003/0074275 A1 | 4/2003 | Salle | |
| 2007/0260890 A1 | 11/2007 | Bandholz et al. | |

OTHER PUBLICATIONS

Capacity on Demand for ProLiant Servers; HP-Canada, (2 pages).

* cited by examiner

*Primary Examiner* — Philip B Tran
(74) *Attorney, Agent, or Firm* — Patterson & Sheridan, LLP (57) ABSTRACT

A design structure embodied in a machine readable storage medium for designing, manufacturing, and/or testing a design is for securing of leased resources on a computer. The design structure includes a computer for securing resources may comprise at least one processor, a plurality of resources, wherein each resource is associated with configuration data and a programmable logic device connected to each of the plurality of resources. The programmable logic device may be configured for determining whether a resource is leased, reading un-encoded configuration data from a resource, and sending the configuration data to a first unit, if the resource is not leased. The programmable logic device may further be configured for reading encoded configuration data from a resource, decoding the configuration data, sending the configuration data that was decoded to a first unit, and logging use of the resource by the first unit, if the resource is leased.

11 Claims, 5 Drawing Sheets

STRUCTURE FOR SECURING LEASED RESOURCES ON A COMPUTER

CROSS-REFERENCE TO RELATED APPLICATION

This application is a continuation-in-part of U.S. patent application Ser. No. 11/382,080, filed May 8, 2006 now U.S. Pat. No. 7,707,290, which is herein incorporated by reference.

BACKGROUND OF THE INVENTION

1. Field of the Invention

The present invention generally relates design structures, and more specifically to design structures in the field of leased computing and more specifically to securing leased resources on a computer.

2. Description of the Related Art

Some consumers want to have the ability to use additional computing resources when the need arises but don't want to incur the initial expense of buying the additional resources. Computing resources include hard drives, memory modules, server blades, whole servers, or the like. In order to meet this need, certain vendors offer computing equipment that come with additional resources that are priced based on usage. These vendors allow clients or customers to buy or lease a computer or server with regularly usable resources in addition to a set of leased resources for which the client pays based on use. When a client uses a leased resource, he is billed for what he uses in the same way water and electricity utility customers are. This model is referred to as "demand leased" computing. The computer or server in question is managed by the client and kept at the client's location. Non-leased resources on the computer are used without restriction by the client. When leased resources on the computer are used by the client, the vendor bills the client according to usage on a periodic basis, such as monthly.

Current demand leased computer units can be configured with additional leased resources which can be activated as required by a customer. Thus, additional disabled leased resources can be activated depending on increased resource demand or a need to meet growth patterns of an information technology (IT) infrastructure of a customer. When leased resources are activated the vendor of the leased resources charges the customer accordingly for his use. There currently is no method, however, for securing leased resources in this environment.

One approach to the problem of securing leased resources in a demand leased computer unit is through software measures. Software security measures, however, are much more easily defeated than hardware measures and can't be used at all in many circumstances. It is desirable for a demand leased provider to be able to control its leased resources before the customer activates them. If a vendor's control over leased resources is weak or non-existent, the customer could potentially use the resources without paying to have them activated. Furthermore, without an effective method to tie the operation of a leased resource to a single demand leased computer unit, a customer could possibly remove the leased resource from the demand leased computer unit and use it on another computer, such as a competitor's server, without paying for its use. A leased resource that is "hijacked" in this way can be used as a regular device by another server. Thus, there are currently few precautions for preventing leased resources in a demand leased computer unit from being recognized, configured, enabled and used without any restrictions.

Thus, the need arises to solve the problems with the prior art above and specifically for a more efficient way to secure leased resources in a demand leased computer unit.

BRIEF SUMMARY OF THE INVENTION

Embodiments of the invention address deficiencies of the art in respect to securing of leased resources in a demand leased computing environment and provide a novel and non-obvious method, system and computer program product for securing of leased resources on a computer. In one embodiment of the present invention, a computer for securing resources may comprise at least one processor, a plurality of resources, wherein each resource is associated with configuration data and a programmable logic device connected to each of the plurality of resources. The programmable logic device may be configured for determining whether a resource is leased, reading un-encoded configuration data from a resource, and sending the configuration data to a first unit, if the resource is not leased. The programmable logic device may further be configured for reading encoded configuration data from a resource, decoding the configuration data, sending the configuration data that was decoded to a first unit, and logging use of the resource by the first unit, if the resource is leased.

The plurality of resources of the computer may comprise at least one of a processor, a hard drive, a memory module and a server blade. The programmable logic device may be connected to each of the plurality of resources via an SMBUS and configuration data may comprise serial product data of a resource. Configuration data of a resource may reside on an EEPROM of the resource and the first unit may comprise a BIOS program of another computer.

In another embodiment of the present invention, a method for securing resources of a computer can include receiving a request from a first unit for configuration data of a resource of the computer and determining whether the resource is leased. The method may further include reading un-encoded configuration data from the resource and sending the configuration data to the first unit, if the resource is not leased. The method may further include reading encoded configuration data from the resource, decoding the configuration data, sending the configuration data that was decoded to the first unit, and logging use of the resource by the first unit, if the resource is leased.

In another embodiment, a design structure embodied in a machine readable storage medium for at least one of designing, manufacturing, and testing a design is provided. The design structure generally includes a computer for securing resources. The computer generally includes at least one processor, a plurality of resources, wherein each resource is associated with configuration data, and a programmable logic device connected to each of the plurality of resources the programmable logic device configured for determining whether a resource is leased, reading un-encoded configuration data from a resource, sending the configuration data to a first unit, if the resource is not leased, reading encoded configuration data from a resource, decoding the configuration data, sending the configuration data that was decoded to a first unit, and logging use of the resource by the first unit, if the resource is leased.

Additional aspects of the invention will be set forth in part in the description which follows, and in part will be obvious from the description, or may be learned by practice of the invention. The aspects of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute part of this specification, illustrate embodiments of the invention and together with the description, serve to explain the principles of the invention. The embodiments illustrated herein are presently preferred, it being understood, however, that the invention is not limited to the precise arrangements and instrumentalities shown, wherein.

DETAILED DESCRIPTION OF THE INVENTION

Embodiments of the invention provide a novel and non-obvious method, system and computer program product for securing of leased resources on a computer. The present invention provides a method by which a control agent or configuration module encrypts configuration data on a leased resource but provides decrypted configuration data when an authorized request for the data is received. This secures a leased resource such that a separate computer cannot use the leased resource due to the encrypted configuration data. If the leased resource is removed from the computer, the leased resource will remain in an offline state and will not be functional in any other computer system. To force the user of the computer to return the leased resource to its original location, a polling procedure is executed whereby all leased resources are periodically polled for their encrypted configuration data and compared to an original list of leased resources and corresponding encrypted configuration data. If the queried leased resources are not present during polling, the customer is informed that the computer will be shut down unless the leased resource is replaced in a predetermined period of time.

Figure 1:
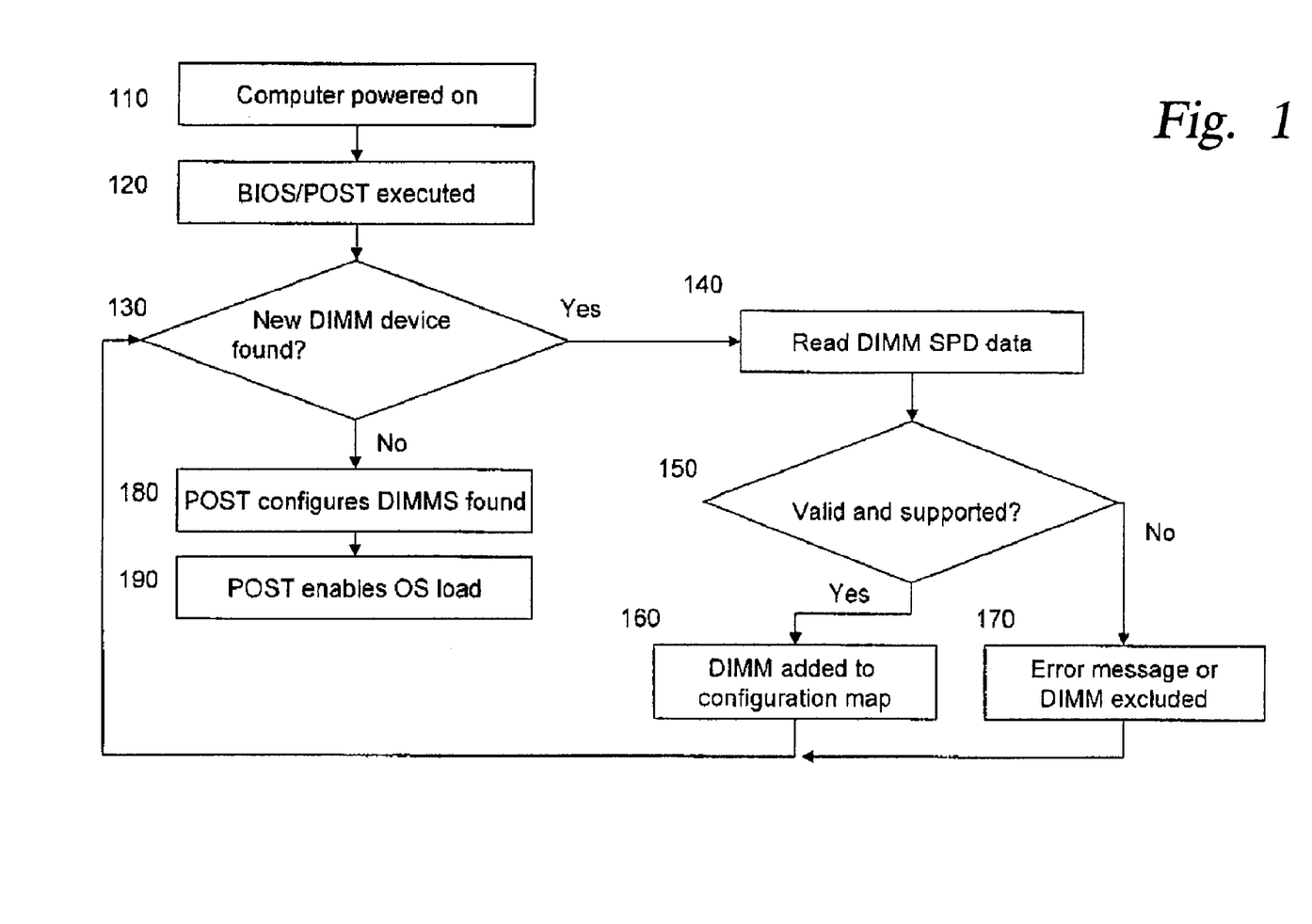
FIG. 1 is a flow chart illustrating a conventional process for configuring resources on a computer.

FIG. 1 is a flow chart illustrating a conventional process for configuring resources on a computer. A resource may include a processor, a hard drive, a memory module, a server blade or the like. It is assumed for FIG. 1 that the manufacturer of the resource at issue has programmed and stored the identification and configuration data of the resource either on the resource itself or on an associated component.

The configuration data for a dual inline memory module (DIMM), for example, consists of Serial Presence Detect (SPD) data that is stored in an electrically erasable programmable read-only memory (EEPROM) associated with the DIMM. An EEPROM is a programmable memory that can be erased by exposing it to an electrical charge but retains its contents even when power to the computer is turned off. The EEPROM can be rewritten or reprogrammed. The SPD data of the DIMM is written to the EEPROM in JEDEC standardized format by the DIMM vendor before it is sold to a computer manufacturer or the general public. The SPD data includes a description of the DIMM's technology, memory size, memory speed, CAS latency, RAS latency, and other defining characteristics.

The flow chart of FIG. 1 uses a DIMM as an example of a resource that is configured for use on a computer. In block 110, a user of the computer powers on the machine. In block 120, the Basic Input Output System (BIOS) and Power on Self Test (POST) programs of the computer are initiated. BIOS refers to the built-in software that determines what a computer can do without accessing programs from a disk. On PCs, the BIOS contains all the code required to control the keyboard, display screen, disk drives, serial communications, and a number of miscellaneous functions. POST refers to a diagnostic testing sequence run by a computer's BIOS as the computer's power is initially turned on. The POST determines if the computer's RAM, disk drives, peripheral devices and other hardware components are properly working. If the diagnostic determines that everything is in working order, the computer will continue to boot. The BIOS and POST are typically placed in a ROM chip that comes with the computer, and are commonly referred to as POST/BIOS In block 130, it is determined while scanning for resources whether a new DIMM has been found by the POST/BIOS program. If the result of the determination of block 130 is positive, control flows to block 140. If the result of the determination of block 130 is negative, control flows to block 180. In block 140, the SPD data is read from the EEPROM of the new DIMM found by the POST/BIOS program. In block 150, it is determined whether the new DIMM found by the POST/BIOS program is valid and supported based on the SPD data read from the EEPROM of the DIMM. If the result of the determination of block 150 is positive, control flows to block 160. If the result of the determination of block 150 is negative, control flows to block 170.

In block 160, the POST/BIOS program adds the configuration data of the new DIMM to the configuration map of the computer and control flows back to block 130. In block 170, the POST/BIOS program produces an error message and/or simply excludes the new DIMM from the configuration map of the computer and control flows back to block 130. In block 180, the POST/BIOS program configures the leased DIMMs that were found by process 130, if valid and supported. In block 190, the POST/BIOS program enables the operating system to load and the runs the operating system with the leased DIMMs configured above.

Figure 2:
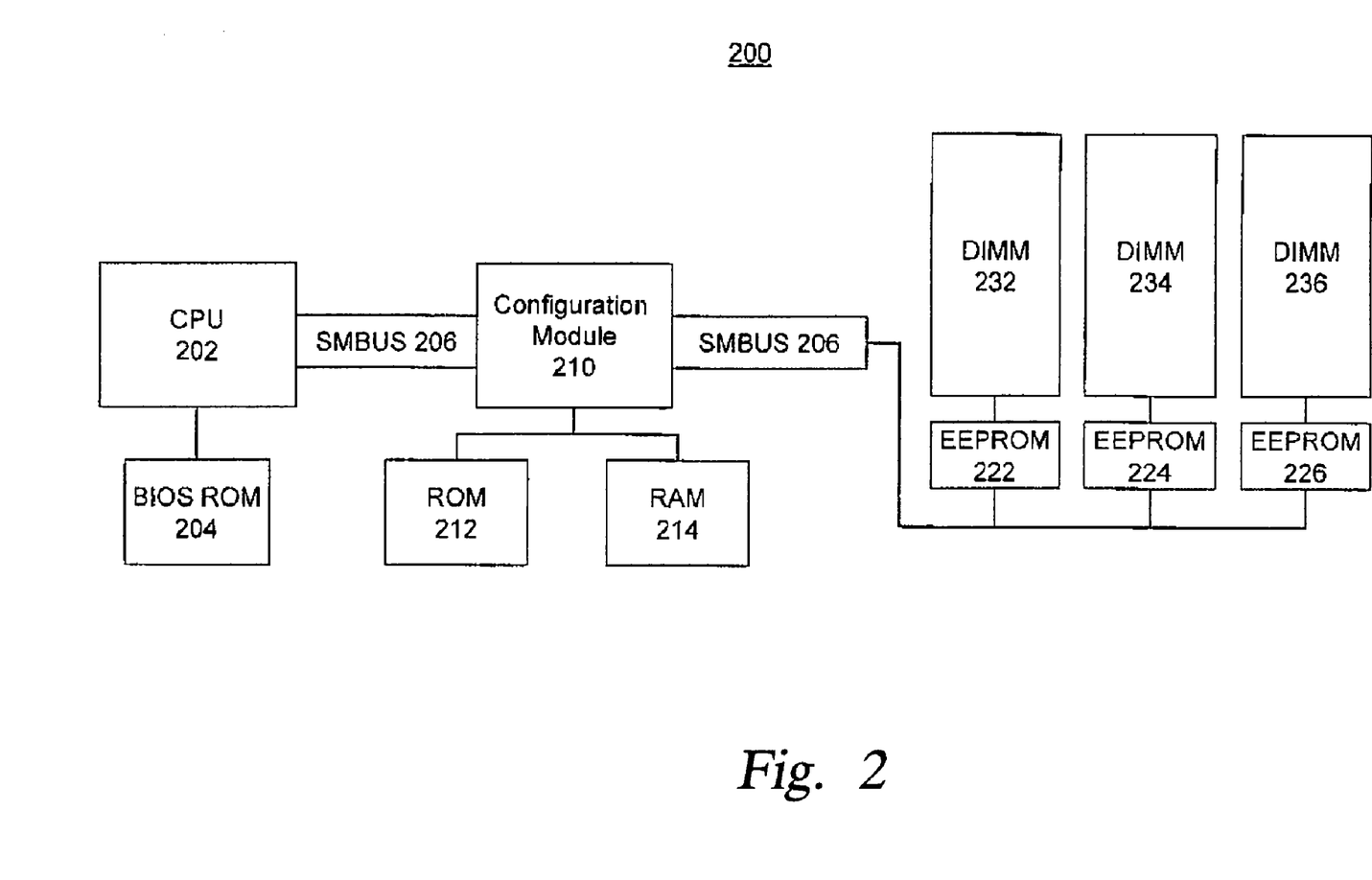
FIG. 2 is a schematic illustration of a system for securing leased resources on an a computer, according to one embodiment of the present invention.

FIG. 2 is a schematic illustration of a system for securing leased resources on a computer 200, according to one embodiment of the present invention. FIG. 2 shows the central processing unit (CPU) 202 of the computer 200. The CPU 202, which may be one or more processors, is connected via chipset elements and an SMBUS controller to a System Management Bus (SMBUS) 206 to the configuration module 210, which substantially performs the method of the present invention. The configuration module 210 may be a programmable logic device, which is an integrated circuit that can be programmed to perform complex functions. The configuration module 210 is then connected to an SMBUS 207 and further to the EEPROMS 222, 224 and 226, shown here associated with demand leased devices DIMM's 232, 234, 236. The configuration module 210 is used to intercept and modify the SMBUS traffic between SMBUS 206 and SMBUS 207, per the present invention A bus is a collection of wires through which data is internally transmitted from one part of a computer to another. A bus connects all the internal computer components to the CPU and main memory. An inter-integrated circuit bus (I2C) is a type of bus used to connect integrated circuits (ICs). I2C is a multi-master bus, which means that multiple chips can be connected to the same bus and each one can act as a master by initiating a data transfer. An SMBUS is a two-wire interface, which uses an I2C as its backbone, through which a processor can communicate with rest of the computer system. Using an SMBUS, a device or resource can provide manufacturer information, tell the system what its model or part number is, save its state for a suspend event, report different types of errors, accept control parameters and return its status.

In one embodiment (not shown) of the present invention, the CPU 202 is connected to the SMBUS 206 via a north bridge 203A, south bridge 203B, and SMBUS controller 205. In north bridge/south bridge chipset architecture designs, the south bridge 203B is the device or chipset element that controls all of the I/O functions of the computer, such as USB, audio, serial, the system BIOS, the ISA (industry standard architecture) bus, the interrupt controller and the IDE (intelligent drive electronics) channels. All of the functions of a processor are controlled by the south bridge except memory, PCI (peripheral component interconnect) devices and AGP (accelerated graphics port) devices. The other device or chipset element is the north bridge; the north bridge 203A is the device or chipset element that connects a CPU to memory, the PCI bus, Level 2 cache and AGP activities. The north bridge device or chipset element communicates with the CPU through the CPU bus.

A ROM 204 for storing the BIOS/POST programs of the computer 200 is connected to the CPU 202 via chipset elements 203A and 203B. Further a ROM 212 and a RAM 214 are connected to the configuration module 210 for storing configuration data, as described in more detail below. The SMBUS, as it traverses from SMBUS 206 to SMBUS 207 via configuration module 210, further connects the configuration module 210 to the EEPROM 222, 224 and 226 of each DIMM 232, 234 and 236, respectively. The EEPROM 222, 224 and 226 stores the configuration data, such as the SPD, of each DIMM 232, 234 and 236, respectively. It should be noted that although FIG. 2 shows only DIMMs as resources that may be secured, DIMMs are used by way of example only and the present invention supports the securing of any type of leased resource including hard drives, other memory modules, CPU's, and server blades. Such elements, if connected to SMBUS 207 and handled per the present invention, could be treated as 'demand leased' devices. Further, although FIG. 2 shows only three DIMMs, the system of the present invention supports any viable number of leased resources that may be secured.

Figure 3:
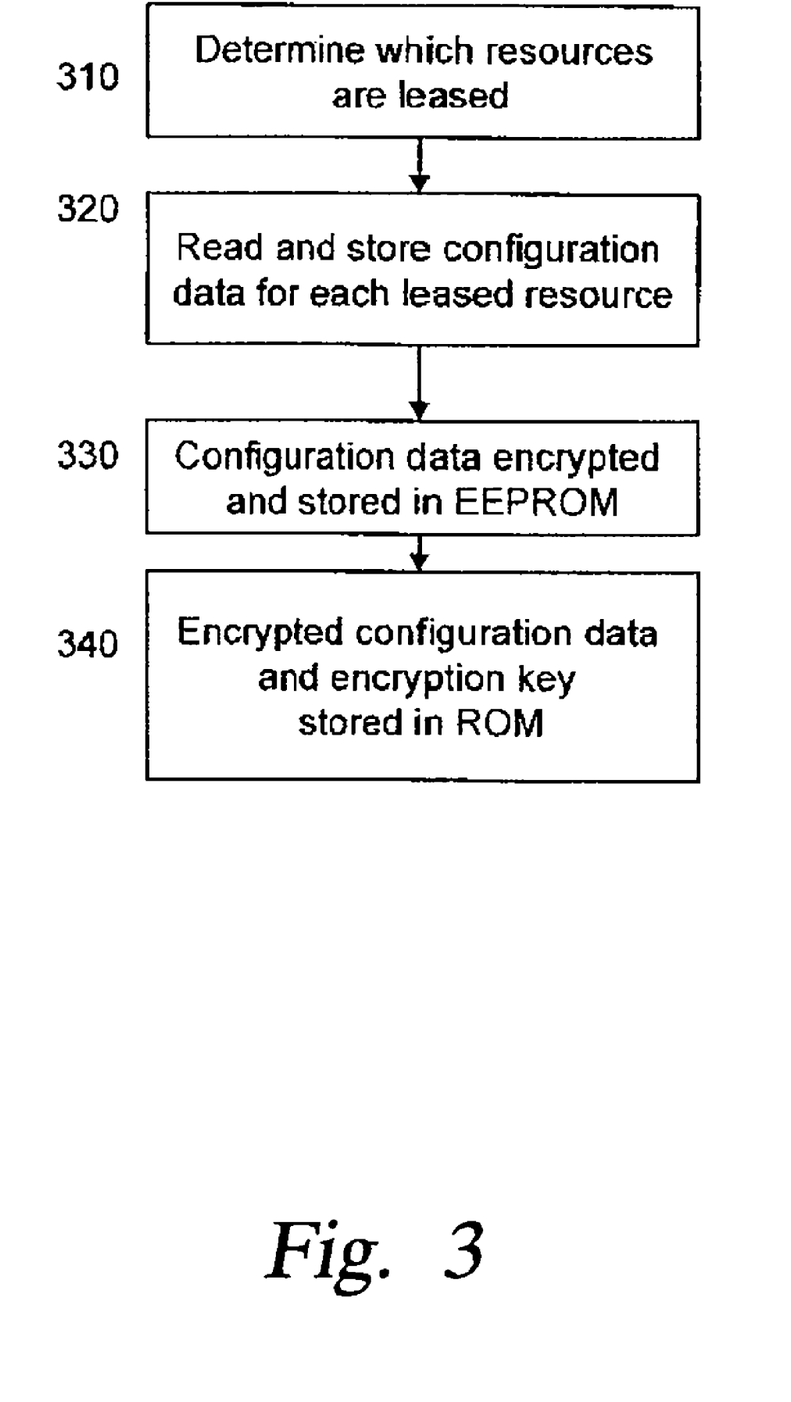
FIG. 3 is a flow chart illustrating a process for modifying configuration data of leased resources on a computer, according to one embodiment of the present invention.

FIG. 3 is a flow chart illustrating a process for modifying configuration data of leased resources on a computer, such as computer 200, according to one embodiment of the present invention. The process of the flow chart of FIG. 3 describes how the configuration module 210 configures leased resources before the resources are available for use by a user of computer 200. The flow chart of FIG. 3 uses a DIMM as an example of a leased resource that is configured for use by the user of the computer 200.

In block 310, the leasor, in this case the computer manufacturer or distributor, determines which specific devices are to be leased based upon the sales agreement with the end customer. At this time, a utility program is loaded and executed by CPU 202. This utility identifies to configuration module 210 specific resources that will be leased to the user of computer 200. In one embodiment of the present invention, the utility program polls the resources of the computer 200 and determines which resources are leased based on the configuration data present on each resource. For example, the configuration data present on a resource may include an indicator such as a code or a sequence of bits that is predefined to indicate the leased nature of a resource. In another example, a predefined bit on a resource may indicate, insofar as it is set or not set, that the resource is leased.

In block 320, the configuration module 210 performs a read transaction via the SMBUS of the EEPROM of each DIMM identified as a leased resource in block 310 above. The configuration module 210 reads the SPD data from each identified EEPROM and stores it in the RAM 214. In block 330, the configuration data for the corresponding DIMM is encrypted using a predefined encryption algorithm (encryption key) and the encrypted configuration data is then written back to the EEPROM for that DIMM (or device). In addition, a flag may be stored in the EEPROM to indicate that the particular device is under lease control. In block 340, an indicator of the leased state of each device and the encryption key for each leased EEPROM is then stored in the ROM 212 so as to prevent it from being erased when power is lost.

The encryption of block 330 may be executed in a variety of ways. The configuration data may be encrypted using either asymmetric encryption, wherein a public key is used to encrypt data and a private key is used to decrypt data, or symmetric encryption wherein the same key is used to encrypt and decrypt data. The purpose of the encryption is to save the SPD data on the resource in such a way that it is not immediately readable (identifiable) by a BIOS/POST program in a computer system that does not implement the use of the configuration module 210. Thus, if the BIOS/POST program of another system that is not system 200 attempts to configure the resources 232, 234, 236, it will not be able to complete the configuration because it will read the encrypted data and lack the ability to decrypt it. In this way, the present invention forces the customer to use the configuration module 210, which regulates the use of leased resources and enables billing of the customer according to his use of the resource.

The previous discussion outlined how leased devices are identified and activated at the time of manufacture or customer delivery. However, the 'demand leased' resources on the computer 200 may be enabled or disabled by the customer at any time. The act of being enabled indicates that a leased resource is operating and ready for use. The act of being disabled indicates that a leased resource is not ready for use. In an embodiment of the present invention, the fact that configuration data of a leased resource has been encrypted and written back to the leased resource in an encrypted manner indicates that the leased resource is available in the system identified by the lease. Further, the encrypted configuration data may also include an indicator that the leased resource is actively being leased.

The process of the flowchart of FIG. 3 secures a leased resource such that a separate computer cannot use the leased resource due to the encrypted configuration data. If the leased resource is removed from the original computer 200, the leased resource will remain in an offline state and will not be functional in any other computer system. This is because the BIOS of the other computer system would not understand the encrypted configuration data on the leased resource and therefore would not be able to configure it properly.

Figure 4:
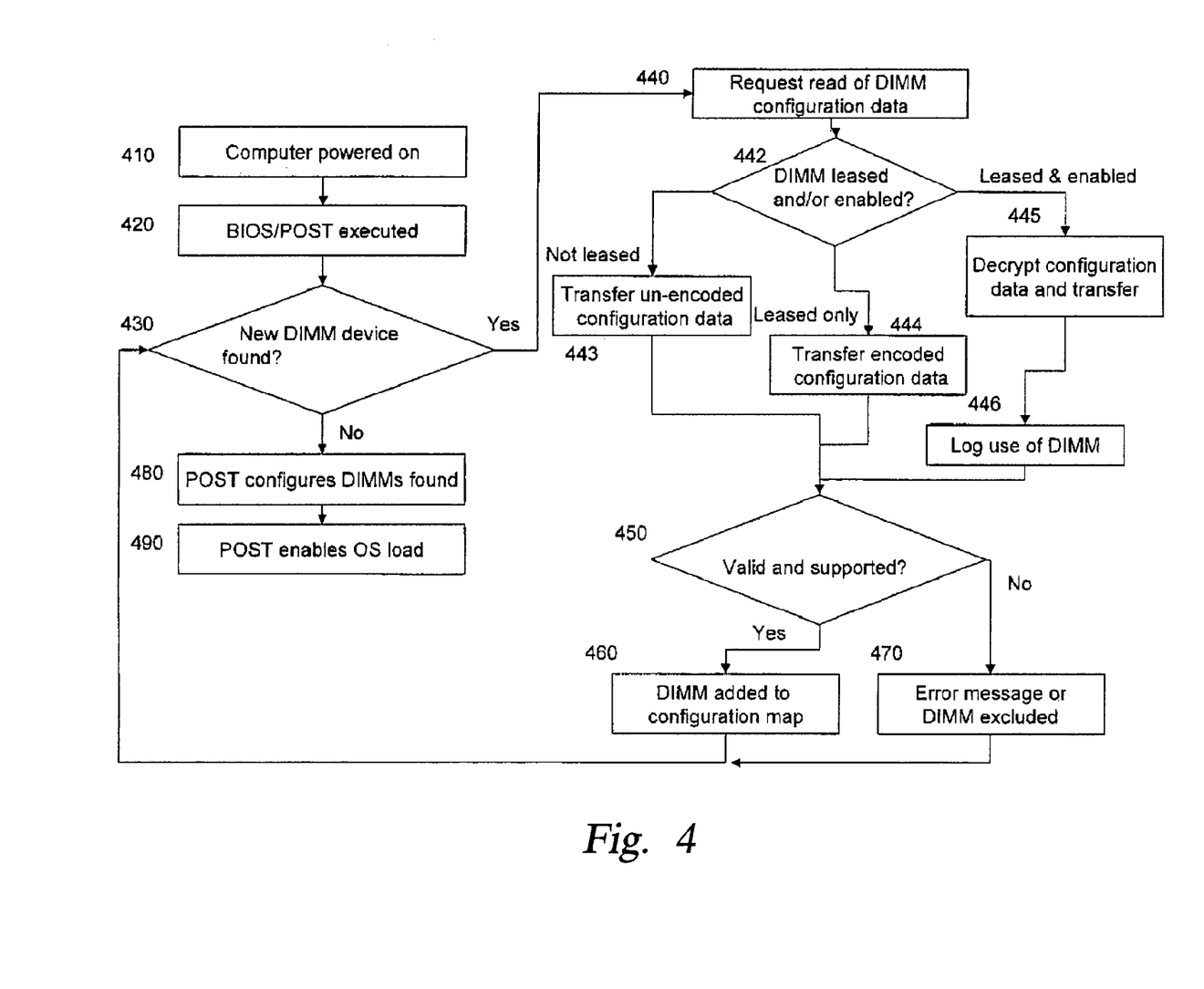
FIG. 4 is a flow chart illustrating a process for securing leased resources on a computer, according to one embodiment of the present invention.

In one embodiment of the present invention, the configuration module 210 can poll all leased resources periodically for their encrypted configuration data, which is then compared to the list of leased resources that is stored in ROM 212. This process insures that a leased resource present in the computer 200 when shipped is still installed in the computer. This provides added protection because it detects the presence of leased resources on the computer as well as the type of resources present. If the queried leased resources are not present during polling, the customer may be informed that the computer will be shut down unless the leased resource is replaced in a predetermined period of time FIG. 4 is a flow chart illustrating a process for securing leased resources on a computer, such as computer 200, according to one embodiment of the present invention. A leased resource may include a processor, a hard drive, a memory module, a server blade or the like. The flow chart of FIG. 4 uses a DIMM as an example of a leased resource that is accessed for use by a user of computer 200.

In block 410, a user of computer 200 powers on his machine. In block 420, the BIOS and POST programs of the computer are initiated. In block 430, it is determined by the computer whether a new DIMM resource on the computer 200 has been found by the BIOS/POST program. In one embodiment of the present invention, the computer determines the presence or absence of resources by addressing each SMBUS address on the various busses. When resources are not present, the SMBUS controller generates a no-acknowledgement response back to the computer. If the result of the determination of block 430 is positive, control flows to block 440. If the result of the determination of block 430 is negative, control flows to block 480. In block 440, the CPU 202 of the computer 200 sends a request to read the SPD data from the EEPROM 222 of the new DIMM 232 found by the BIOS/POST program. The configuration module 210 receives this request. In block 442, the configuration module 210 determines whether the DIMM 232 referred to by the CPU 202 is a resource that is leased and/or enabled. In one embodiment of the present invention, the configuration module 210 determines whether the DIMM 232 is leased and/or enabled by forwarding an SMBUS 206 read request initiated by CPU 202 onto SMBUS 207. The configuration module 210 then intercepts the response data from the targeted device (such as DIMM 232), and the returned SPD data will include one or more indicators of whether the resource is leased and/or enabled.

If the DIMM 232 is not leased, in block 443 the configuration module 210 reads the un-encrypted configuration data (SPD) from the EEPROM 222 of the DIMM 232 and sends it to the CPU 202. If the DIMM 232 is leased but not enabled, in block 444 the configuration module 210 reads the encrypted configuration data (SPD) from the EEPROM 222 of the DIMM 232 and sends it (in encrypted format) to the CPU 202.

If the DIMM 232 is leased and enabled, in block 445 the configuration module 210 reads the encrypted configuration data (SPD) from the EEPROM 222 of the DIMM 232, decrypts the configuration data and sends it to the CPU 202. In step 446, the computer 200 logs use of the leased resource (the DIMM 232) so as to charge the customer for its use.

In block 450, it is determined by the computer 200 whether the new DIMM found by the BIOS/POST program is valid and supported based on the SPD data received from the configuration module 210. If the result of the determination of block 450 is positive, control flows to block 460. If the result of the determination of block 450 is negative, control flows to block 470.

In block 460, the BIOS/POST program adds the configuration data of the new DIMM to the configuration map of the computer 200 and control flows back to block 430. In block 470, the BIOS/POST program produces a notification message and/or simply excludes the new DIMM from the configuration map of the computer 200 and control flows back to block 430. In block 480, the BIOS/POST program configures the computer 200 to utilize the DIMMs that were added to the configuration map by process 480. In block 490, the BIOS/POST program enables the operating system to load and the runs the operating system with the DIMMs configured above.

Figure 5:
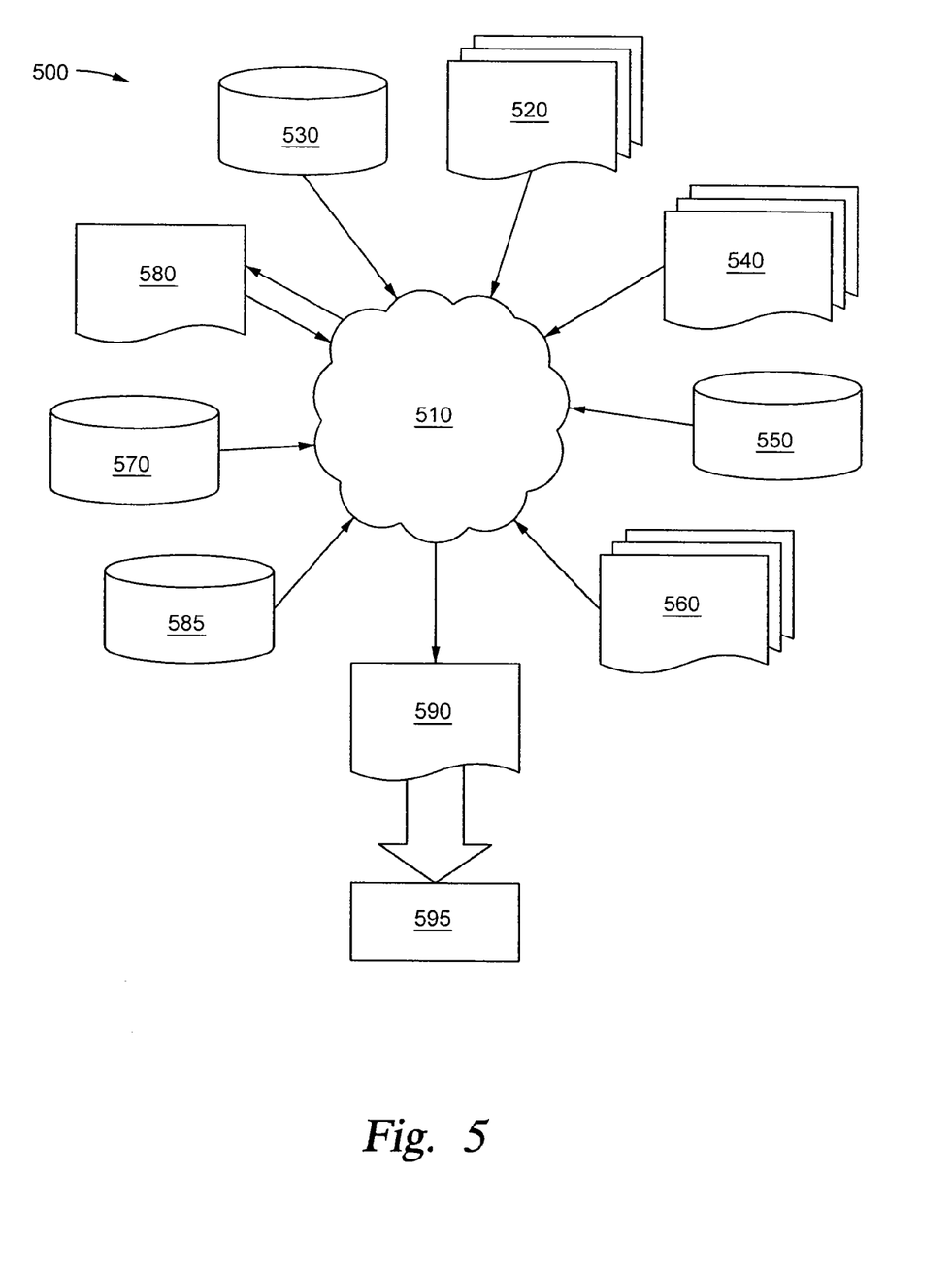
FIG. 5 is a flow diagram of a design process used in semiconductor design, manufacture, and/or test.

FIG. 5 shows a block diagram of an exemplary design flow 500 used for example, in semiconductor design, manufacturing, and/or test. Design flow 500 may vary depending on the type of IC being designed. For example, a design flow 500 for building an application specific IC (ASIC) may differ from a design flow 500 for designing a standard component. Design structure 520 is preferably an input to a design process 510 and may come from an IP provider, a core developer, or other design company or may be generated by the operator of the design flow, or from other sources. Design structure 520 comprises the circuit described above and shown in FIG. 2 in the form of schematics or HDL, a hardware-description language (e.g., Verilog, VHDL, C, etc.). Design structure 520 may be contained on one or more machine readable medium. For example, design structure 520 may be a text file or a graphical representation of a circuit as described above and shown in FIG. 2. Design process 510 preferably synthesizes (or translates) the circuit described above and shown in FIG. 2 into a netlist 580, where netlist 580 is, for example, a list of wires, transistors, logic gates, control circuits, I/O, models, etc. that describes the connections to other elements and circuits in an integrated circuit design and recorded on at least one of machine readable medium. For example, the medium may be a storage medium such as a CD, a compact flash, other flash memory, or a hard-disk drive. The medium may also be a packet of data to be sent via the Internet, or other networking suitable means. The synthesis may be an iterative process in which netlist 580 is resynthesized one or more times depending on design specifications and parameters for the circuit.

Design process 510 may include using a variety of inputs; for example, inputs from library elements 530 which may house a set of commonly used elements, circuits, and devices, including models, layouts, and symbolic representations, for a given manufacturing technology (e.g., different technology nodes, 32 nm, 45 nm, 90 nm, etc.), design specifications 540, characterization data 550, verification data 560, design rules 570, and test data files 585 (which may include test patterns and other testing information). Design process 510 may further include, for example, standard circuit design processes such as timing analysis, verification, design rule checking, place and route operations, etc. One of ordinary skill in the art of integrated circuit design can appreciate the extent of possible electronic design automation tools and applications used in design process 510 without deviating from the scope and spirit of the invention. The design structure of the invention is not limited to any specific design flow.

Design process 510 preferably translates a circuit as described above and shown in FIG. 2, along with any additional integrated circuit design or data (if applicable), into a second design structure 590. Design structure 590 resides on a storage medium in a data format used for the exchange of layout data of integrated circuits (e.g. information stored in a GDSII (GDS2), GL1, OASIS, or any other suitable format for storing such design structures). Design structure 590 may comprise information such as, for example, test data files, design content files, manufacturing data, layout parameters, wires, levels of metal, vias, shapes, data for routing through the manufacturing line, and any other data required by a semiconductor manufacturer to produce a circuit as described above and shown in FIG. 2. Design structure 590 may then proceed to a stage 595 where, for example, design structure 590: proceeds to tape-out, is released to manufacturing, is released to a mask house, is sent to another design house, is sent back to the customer, etc.

The embodiments of the invention can take the form of an entirely hardware embodiment, an entirely software embodiment or an embodiment containing both hardware and software elements. In one embodiment, the invention is implemented in software, which includes but is not limited to firmware, resident software, microcode, and the like. Furthermore, the invention can take the form of a computer program product accessible from a computer-usable or computer-readable medium providing program code for use by or in connection with a computer or any instruction execution system.

For the purposes of this description, a computer-usable or computer readable medium can be any apparatus that can contain, store, communicate, propagate, or transport the program for use by or in connection with the instruction execution system, apparatus, or device. The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution. Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modem and Ethernet cards are just a few of the currently available types of network adapters.

What is claimed is:

1. A non-transitory machine readable storage medium containing a design structure for at least one of designing, manufacturing, and testing a design, wherein the design structure, when read from the non-transitory machine readable storage medium by a processor, executes a functionality of a computer for securing resources, the computer comprising:
   at least one processor;
   a plurality of resources, wherein each resource is associated with configuration data;
   a programmable logic device connected to each of the plurality of resources, the programmable logic device configured for:
   (i) receiving a request from a requestor for configuration data of a resource of the computer;
   (ii) determining whether the resource is leased and whether the resource is enabled;
   (iii) if the resource is not leased, reading un-encoded configuration data from the resource and sending the un-encoded configuration data to the requestor; and
   (iv) if the resource is leased and enabled, reading encoded configuration data from the resource, decoding the encoded configuration data, sending the decoded configuration data to the requestor and logging use of the resource by the requestor.

2. The non-transitory machine readable storage medium of claim 1, the programmable logic device further configured for:
   reading encoded configuration data from the resource, and sending the encoded configuration data to the requestor, if the resource is leased and not enabled.

3. The non-transitory machine readable storage medium of claim 1, further comprising a first data embedded in configuration data of each resource, wherein the first data indicates whether the resource is enabled.

4. The non-transitory machine readable storage medium of claim 1, wherein the plurality of resources includes at least one of a processor, a hard drive, a memory module and a server blade.

5. The non-transitory machine readable storage medium of claim 4, wherein the programmable logic device is connected to each of the plurality of resources via an SMBUS.

6. The non-transitory machine readable storage medium of claim 5, wherein the configuration data comprises serial product data of a resource.

7. The non-transitory machine readable storage medium of claim 6, wherein the configuration data resides on an EEPROM of the resource.

8. The non-transitory machine readable storage medium of claim 7, wherein the requestor comprises a BIOS program of another computer.

9. The non-transitory machine readable storage medium of claim 1, further comprising a second data embedded in configuration data of each resource, wherein the second data indicates whether the resource is enabled.

10. The non-transitory machine readable storage medium of claim 1, wherein the design structure comprises a netlist, which describes the computer.

11. The non-transitory machine readable storage medium of claim 1, wherein the design structure resides on the non-transitory machine readable storage medium as a data format used for the exchange of layout data of integrated circuits.

* * * * *